Patented May 25, 1926.

1,586,241

UNITED STATES PATENT OFFICE.

DIRK COSTER, OF HAARLEM, NETHERLANDS, AND GEORG VON HEVESY, OF COPENHAGEN, DENMARK, ASSIGNORS TO N. V. PHILIPS' GLOEILAMPENFABRIEKEN, OF EINDHOVEN.

SEPARATION OF HAFNIUM AND ZIRCONIUM.

No Drawing. Application filed July 15, 1924. Serial No. 726,172.

This invention has for its object a process of separating the element having the atomic number 72, called hafnium, and zirconium, said process being essentially characterized by the use of sulphuric acid for the separation of hafnium and zirconium by taking advantage of the difference in solubility of zirconium sulphates such as zirconium sulphuric acid $$H_2[Zr(SO_4)_3],$$

zirconyl sulphuric acid $$H_2[ZrO(SO_4)_2]$$

and their salts on one hand and the corresponding hafnium compounds on the other hand.

As zirconium minerals are mostly decomposed by concentrated sulphuric acid treatment or by smelting by means of sodium bisulphate or the like, zirconium sulphate being easily soluble in water, it is of great technical importance that it is possible for sulphuric acid to be utilized for the separation of zirconium and hafnium.

According to the present process of zirconium mineral containing hafnium or the zirconium compound containing hafnium, is treated by concentrated (if necessary also dilute) sulphuric acid or smelted by means of sulphuric acid compounds for example sodium bisulphate. Thus a zirconium hafnium sulphate is obtained which is easily soluble in water.

As regards zirconium sulphate it must be mentioned that by adding sulphuric acid to its aqueous solution its solubility decreases but if the content of $SO_3$ surpasses some 60% it increases owing to the formation of complex salts. A similar remark applies to the corresponding hafnium compounds and when working with the said compounds this condition should be clearly understood.

The solution of zirconium hafnium sulphate may be further treated in different ways which all result in the separation of zirconium and hafnium.

If the aqueous solution of zirconium hafnium sulphate is left alone for some days, a basic sulphate is precipitated in which the proportion between the quantities of hafnium and zirconium is different from that in the original solution. This basic sulphate contains comparatively more or less hafnium than the original solution, according to its being more or less hydrolytically decomposed.

Whether the precipitates are richer or poorer in hafnium than the starting material depends or various factors viz on the difference in velocity at which the zirconium sulphate and the hafnium sulphate react with water, on the difference in the proportion between the quantities of the various basic sulphates produced and on the difference in solubility in water. These factors depend to a marked extent on the temperature to which the sulphate is heated in order to remove the excess of sulphuric acid, on the concentration and the temperature of the solution at which the latter is left alone.

*Example A.*—If a zirconium sulphate containing 3 percent of hafnium sulphate is heated to 400–550° C., after which it is dissolved in a fiftyfold quantity of water and left alone at 40° C., a basic sulphate will be separated containing comparatively more hafnium than the starting product. When the separating out of the basic sulphate stops, the treatment may be continued by evaporating the solution, converting the basic sulphate into neutral sulphate by treating with concentrated sulphuric acid, evaporating the excess, and dissolving the neutral sulphate in water, whereby fractions are obtained which are poorer in hafnium than the starting materials.

On continuing this treatment the separation may be carried to the desired extent and in order to facilitate the precipitation it may then be necessary to partly or wholly neutralize the acid liberated by hydrolysis.

*Example B.*—If a hafnium sulphate containing 6% of zirconium sulphate is started from and otherwise the same procedure is followed as in Example A, the first fractions will contain less and the later fractions will contain more zirconium in proportion to the starting material.

In the production of such basic compounds, as is well known, it is convenient to remove such impurities as iron, titanium and the like from the zirconium; and the purification of the zirconium and the hafnium, in this process, may be combined with the concentration of the hafnium in the zirconium and the removal of the zirconium from the hafnium compounds.

In order to precipitate the zirconium hafnium sulphate, sulphuric acid, alcohol, or other precipitating mediums may be added, by which the precipitation is effected and hurried up.

Furthermore it is possible to take advantage of the difference in solubility of the sulphuric acid complex salts such as $$(NH_4)_4Zr(SO_4)_4.5H_2O;$$
$$(NH_4)_4Zr_4(OH)_8(SO_4)_6.14H_2O;$$
$$K_4Zr(SO_4)_4.2nH_2O;$$
$$K_4Zr_4(OH)_{10}(SO_4)_5.12H_2O;$$
$$K_4Zr_4(OH)_8(SO_4)_5.8H_2O$$

and the like as well as of the corresponding sodium, magnesium and similar compounds. The corresponding hafnium compounds have the aforesaid corresponding formulas.

When utilizing the complex salts one part by weight of zirconium hafnium sulphate may for example be dissolved in two parts by weight of water, whereupon to this solution are added two parts by weight of ammonium sulphate.

When evaporating the solution thus produced, the basic compound $$(NH_4)_4Zr(OH)_8(SO_4)_6nH_2O$$

(and the corresponding hafnium compound) is crystallized, the sulphuric acid being hydrolytically decomposed. Later on, after concentration of the sulphuric acid in the solution, the compound $$(NH_4)_4Zr(SO_4)_4.5H_2O$$

(and the corresponding hafnium compound) is crystallized.

By adding free sulphuric acid, the crystallization may be so effected that directly the compound $$(NH_4)_4Zr(SO_4)_4.5H_2O$$

(and the corresponding hafnium compound) leave the solution by crystallization.

The hafnium compounds are more easily soluble than the zirconium compounds and may therefore be separated from the latter by continued recrystallization the hafnium compounds being thus concentrated in the mother lyes.

The addition of an excess of ammonium sulphate and the like facilitates the separation and is especially recommendable in such cases in which difficultly soluble complex compounds, such for example as potassium salts, are concerned.

The separation of hafnium and zirconium may be obtained by partially precipitating the solution of complex salts. The precipitation may be effected by means of barium chloride or the like or by means of alcohol etc.

Furthermore it is possible to combine the process in which crystallization is resorted to with the fractional precipitation.

Finally, instead of dissolving the zirconium hafnium sulphate in water (and treating the aqueous solution further in one of the described ways) the mixture of salts per se may be heated to a temperature of 450—600°, so that preferably the zirconium sulphate is decomposed into zirconium oxide owing to the fact that the temperature at which hafnium sulphate is decomposed lies higher so that the hafnium sulphate is not decomposed into hafnium oxide and sulphuric trioxide or only to a very slight extent. The soluble hafnium sulphate may be extracted from the heated mixture by means of water or any other suitable solvent, whereas the insoluble oxides remain. The oxides are dissolved in concentrated sulphuric acid if, after the treatment described they have still a certain content of hafnium, whereupon the sulphates are further treated according to one of the processes described.

When adopting the last process described, the mixture of salts may be heated in an atmosphere of sulphuric trioxide which ensures that the hafnium oxide produced if any absorbs $SO_3$ and forms the sulphate, whereas the zirconium oxide is no longer capable of doing so.

The temperature which should be used depends on the partial pressure of the $SO_3$ and is correspondingly slightly higher than in cases in which the decomposition is effected in atmospheric air, in a neutral gas or in a vacuum.

Furthermore the mixture of salts may be admixed with barium oxide or similar materials showing a very high affinity for sulphuric acid.

In this case the decomposition may be effected at a still lower temperature than in the first case.

What we claim is:

1. The process of separating the element having the atomic number 72, called hafnium, and zirconium, characterized by submitting compounds of zirconium and sulphuric acid on the one hand and the corresponding hafnium compounds on the other hand to fractional separation.

2. The process of separating the element having the atomic number 72 called hafnium and zirconium, characterized by submitting a salt of zirconium sulphuric acid on one hand and a salt of the corresponding hafnium compound on the other hand to fractional separation.

3. The process of separating the element having the atomic number 72, called hafnium and zirconium, characterized by submitting a compound of zirconium and sulphuric acid on one hand and the corresponding hafnium compound on the other hand to the other hand to fractional precipitation.

4. The process of separating the element having the atomic number 72, called hafnium and zirconium, characterized by submitting a salt of zirconium sulphuric acid on one hand and a salt of the corresponding hafnium compound on the other hand to fractional precipitation.

5. The process of separating the element having the atomic number 72, called hafnium, and zirconium, characterized in that ammonium sulphate is added to a solution of zirconium and hafnium sulphate, whereupon complex zirconium and hafnium sulphates are separated by crystallization, which sulphates are richer in zirconium than the solution.

6. The process of separating the element having the atomic number 72, called hafnium, and zirconium, characterized in that an excess of ammonium sulphate is added to a solution of zirconium and hafnium sulphate, whereupon complex zirconium and hafnium sulphates are separated by crystallization, which sulphates are richer in zirconium than the solution.

7. The process of separating the element having the atomic number 72, called hafnium and zirconium, characterized in that ammonium sulphate is added to a solution of zirconium and hafnium sulphate, whereupon complex zirconium and hafnium sulphates are formed and that a precipitating medium is added to the solution of said complex salts, precipitates being thus formed which are richer in hafnium than in zirconium.

In testimony whereof we affix our signatures, at the city of The Hague, this 13th day of June, 1924. At the city of Copenhagen, this 27th day of June, 1924.

DIRK COSTER.
GEORG von HEVESY.